(12) United States Patent
Inoue et al.

(10) Patent No.: US 10,476,318 B2
(45) Date of Patent: Nov. 12, 2019

(54) BATTERY-EMBEDDED DEVICE

(71) Applicant: Panasonic Intellectual Property Management Co., Ltd., Osaka (JP)

(72) Inventors: Takashi Inoue, Osaka (JP); Hiroshi Yajima, Osaka (JP); Shinichiro Ito, Osaka (JP); Katsuya Hagiwara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 224 days.

(21) Appl. No.: 15/508,536

(22) PCT Filed: Oct. 6, 2015

(86) PCT No.: PCT/JP2015/005074
§ 371 (c)(1),
(2) Date: Mar. 3, 2017

(87) PCT Pub. No.: WO2016/067528
PCT Pub. Date: May 6, 2016

(65) Prior Publication Data
US 2017/0279316 A1 Sep. 28, 2017

Related U.S. Application Data

(60) Provisional application No. 62/069,247, filed on Oct. 27, 2014.

(51) Int. Cl.
*H02J 7/04* (2006.01)
*H02J 50/80* (2016.01)
(Continued)

(52) U.S. Cl.
CPC .............. *H02J 50/80* (2016.02); *H01M 10/48* (2013.01); *H02J 7/0042* (2013.01);
(Continued)

(58) Field of Classification Search
USPC ........................................................ 320/108
See application file for complete search history.

(56) References Cited

U.S. PATENT DOCUMENTS

2008/0061402 A1* 3/2008 Ishihara ............ H01L 21/76898
257/621
2009/0096413 A1* 4/2009 Partovi ................... H01F 5/003
320/108
(Continued)

FOREIGN PATENT DOCUMENTS

| JP | 9-175145 | 7/1997 |
|---|---|---|
| JP | 10-269762 | 10/1998 |

(Continued)

OTHER PUBLICATIONS

International Search Report of PCT application No. PCT/JP2015/005074 dated Dec. 15, 2015.

*Primary Examiner* — Robert Grant
(74) *Attorney, Agent, or Firm* — McDermott Will & Emery LLP

(57) ABSTRACT

A battery-embedded device includes a substrate having a wiring, a coil fixed to the substrate, a battery fixed to the substrate, and a first temperature detecting element that is disposed on the substrate and configured to detect a temperature of the battery. An occupancy rate of the wiring in a first region of the substrate which is immediately below the first temperature detecting element is lower than an occupancy rate of the wiring in a second region of the substrate other than the first region.

10 Claims, 6 Drawing Sheets

(51) Int. Cl.
  *H01M 10/48*  (2006.01)
  *H02J 50/10*  (2016.01)
  *H02J 7/00*  (2006.01)
  *H02J 7/02*  (2016.01)
  *H01M 2/10*  (2006.01)

(52) U.S. Cl.
  CPC ............ *H02J 7/0091* (2013.01); *H02J 7/025* (2013.01); *H02J 7/047* (2013.01); *H02J 50/10* (2016.02); *H01M 2/105* (2013.01)

(56) References Cited

U.S. PATENT DOCUMENTS

| | | | |
|---|---|---|---|
| 2012/0262109 A1 | 10/2012 | Toya et al. | |
| 2013/0278226 A1* | 10/2013 | Cong | .................. H02J 7/007 320/150 |
| 2014/0023897 A1 | 1/2014 | Suga | |

FOREIGN PATENT DOCUMENTS

| | | |
|---|---|---|
| JP | 2006-029787 | 2/2006 |
| JP | 2011-185701 | 9/2011 |
| JP | 2012-221854 | 11/2012 |
| WO | 2012/137289 | 10/2012 |
| WO | 2013/047260 | 4/2013 |

\* cited by examiner

BATTERY-EMBEDDED DEVICE

TECHNICAL FIELD

The present disclosure relates to a battery-embedded device which is used in various kinds of electronic devices and more particularly to a battery-embedded device having a non-contact charging function.

BACKGROUND

A battery-embedded device has a configuration in which an embedded battery is charged in a non-contact manner with power transferred from a power transmitting coil to a power receiving coil by electromagnetic induction, and this device is used in many electronic devices. In the battery-embedded device, the embedded battery is heated by heat generated in the power receiving coil or a circuit substrate. Therefore, as illustrated in FIG. 7, Unexamined Japanese Patent Publication No. 2012-221854 discloses a configuration in which power receiving coil 103, circuit substrate 102, and embedded battery 104 are separately disposed in order to prevent a temperature rise in embedded battery 104 caused when power is transferred from power transmitting coil 111 in charging stand 110 to power receiving coil 103, so that heat is not likely to be transferred from power receiving coil 103 and circuit substrate 102 to embedded battery 104.

SUMMARY

A battery-embedded device in the present disclosure includes a substrate having a wiring, a coil fixed to the substrate, a battery fixed to the substrate, and a first temperature detecting element that is disposed on the substrate and configured to detect a temperature of the battery. In addition, an occupancy rate of the wiring in a first region of the substrate which is immediately below the first temperature detecting element is lower than an occupancy rate of the wiring in a second region of the substrate other than the first region.

According to the present disclosure, even when the wiring is heated in the substrate, a temperature of the first temperature detecting element can be prevented from rising due to the heated wiring because the occupancy rate of the wiring is low in the region which is immediately below the first temperature detecting element. Therefore, a temperature measured by the first temperature detecting element is not likely to be higher than an actual temperature of the battery, so that a charging current can be prevented from being unnecessarily reduced.

DESCRIPTION OF EMBODIMENTS

As electronic devices have been reduced in size in recent years, a battery-embedded device mounted on the electronic device is required to be also reduced in size and thickness. Therefore, unlike the battery-embedded device disclosed in Unexamined Japanese Patent Publication No. 2012-221854, the power receiving coil and the circuit substrate cannot be separately disposed, and the power receiving coil and the circuit substrate need to be closely disposed. However, when the power receiving coil and the circuit substrate are closely disposed, a metal wiring in the circuit substrate is raised in temperature by induction heating caused by an alternating magnetic field sent to the power receiving coil to supply power. Therefore, the problem is that a temperature sensor for measuring the temperature of the battery wrongly measures the temperature which is higher than an actual temperature due to an influence from the metal wiring which is raised in temperature in the circuit substrate due to the induction heating.

Thus, the present disclosure provides a battery-embedded device capable of preventing measurement accuracy from deteriorating in the temperature sensor for measuring the temperature of the battery, even when the power receiving coil and the circuit substrate are closely disposed.

Hereinafter, exemplary embodiments of the present disclosure will be described with reference to the drawings.

First Exemplary Embodiment

Figure 1:
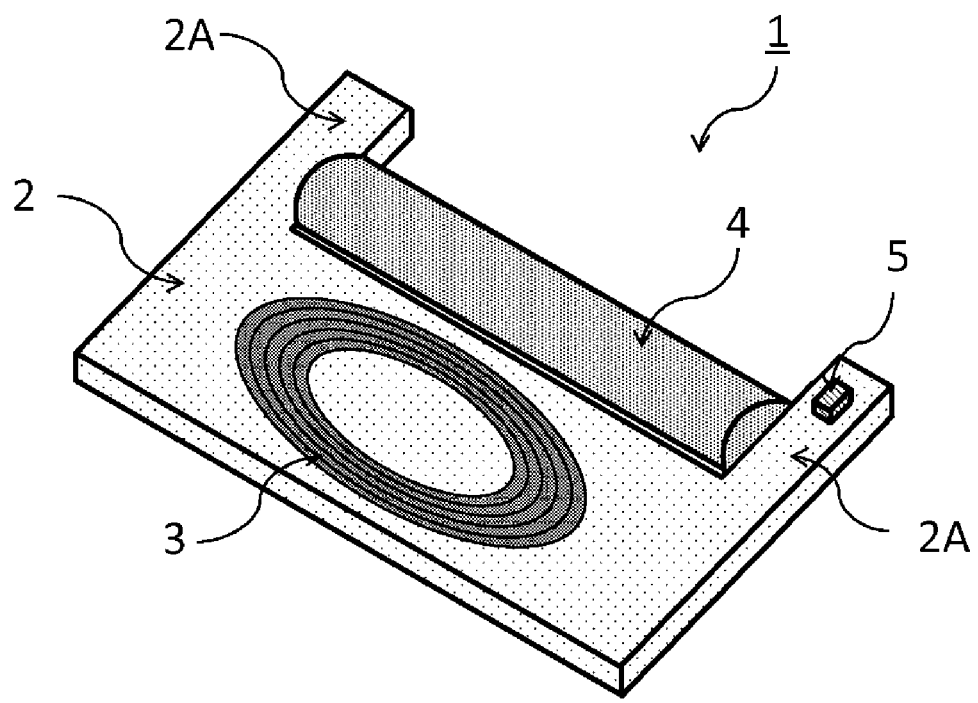
FIG. 1 is a schematic perspective view illustrating an outer appearance of a battery-embedded device in a first exemplary embodiment.

FIG. 1 is a schematic perspective view illustrating an outer appearance of a battery-embedded device in the first exemplary embodiment. As illustrated in FIG. 1, battery-embedded device 1 includes substrate 2, power receiving coil 3, battery 4, and temperature sensor 5. Power receiving coil 3 is disposed on substrate 2, and battery 4 is fixed to a U-shaped notched portion in substrate 2. In addition, temperature sensor 5 is disposed on projection portion 2A projecting from the notched portion in substrate 2. As will be described below, substrate 2 is a multi-layer wiring substrate containing buried wiring, and has a thickness of about 0.2 mm to 2.0 mm. In addition, projection portion 2A has a width of about 1 mm to 5 mm.

Here, power receiving coil 3 is made of a copper wiring elliptically wound and fixed. In addition, power receiving coil 3 may be disposed directly on substrate 2, or may be disposed with a magnetic sheet interposed between power receiving coil 3 and substrate 2. Furthermore, power receiving coil 3 may be circular or rectangular in shape. Here, in the present disclosure, the term "being disposed on the substrate" means not only being directly disposed on the substrate, but also being disposed on the substrate with another component (such as magnetic sheet or dielectric sheet) interposed.

Battery 4 may be a cylindrical lithium-ion battery. Battery 4 is fixed to substrate 2 with a bonding agent (not illustrated), for example. Furthermore, a positive terminal and a negative terminal of battery 4 are electrically connected to the wirings in substrate 2. Battery 4 is about 3 mm in diameter and about 20 mm in length. For battery 4, various secondary batteries may be used such as a square lithium-ion battery and a lithium-polymer battery, in addition to the cylindrical lithium-ion battery illustrated in FIG. 1.

Temperature sensor 5 is a thermistor. The thermistor is a temperature detecting element using a resistance value varying based on temperature. Furthermore, temperature sensor is not necessarily the thermistor and may be any sensor such as a sensor using a thermocouple, as long as it can detect the temperature. Temperature sensor 5 is 0.2 mm to 1.6 mm in width, 0.4 mm to 3.2 mm in length, and 0.1 mm to 1 mm in height.

Figure 2:
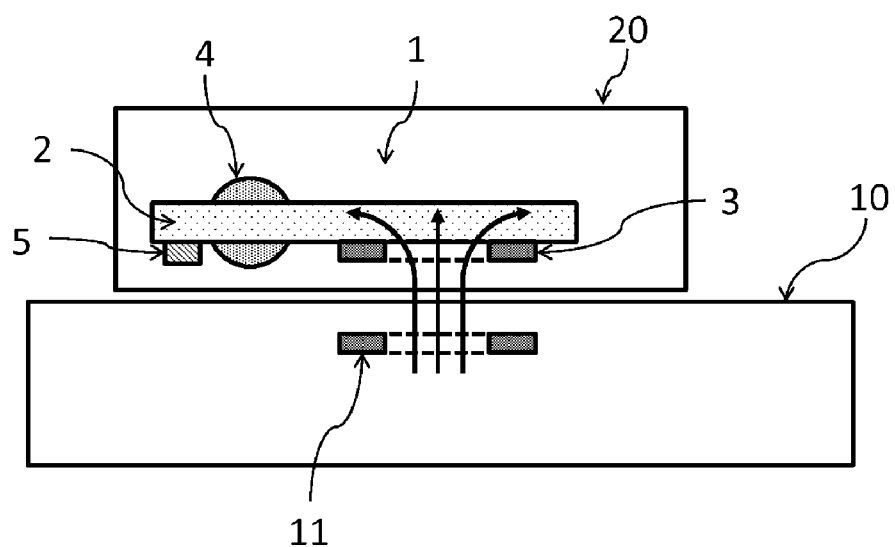
FIG. 2 is a schematic view of a charge system using the battery-embedded device in the first exemplary embodiment.

FIG. 2 is a schematic view of a charge system including the battery-embedded device in this exemplary embodiment. When electronic device 20 including battery-embedded device 1 is charged, electronic device 20 is disposed on charging stand 10 having power transmitting coil 11 such that power receiving coil 3 of battery-embedded device 1 is placed near power transmitting coil 11. In addition, battery-embedded device 1 is wholly covered with resin (not illustrated) when it is set inside electronic device 20.

Power transmitting coil 11 is connected to an AC power supply (not illustrated) and an alternating magnetic field is generated. Thus, an induction current is generated in power receiving coil 3 by electromagnetic induction generated by the alternating magnetic field. The induction current is rectified and used for charging battery 4. Here, to prevent battery 4 from being damaged by heat generated when battery 4 is overcharged, a charging current is controlled by a charge control circuit (not illustrated).

The charge control circuit reduces the charging current or stops the charging when the temperature of battery 4 measured by temperature sensor 5 exceeds a predetermined temperature, so that the temperature of battery 4 can stop rising. In addition, the charge control circuit restores the charging current or restarts the charging when the temperature measured by temperature sensor 5 drops below the predetermined temperature.

Furthermore, when the charge control circuit reduces the charging current or stops the charging, the charge control circuit sends a signal to a control circuit (not illustrated) of the charging stand through the power receiving coil so as to reduce intensity of the alternating magnetic field from power transmitting coil 11 based on a degree of reduction in charging current. Thus, power which is not used for the charging can be prevented from being wastefully supplied.

Here, in a case where the temperature measured by temperature sensor 5 is higher than the actual temperature of battery 4 because of an influence of a temperature rise in substrate 2, the charge control circuit wrongly determines that battery 4 reaches the predetermined temperature although the temperature of battery 4 does not yet reach the predetermined temperature actually, and the charge control circuit reduces the charging current or stops the charging. Therefore, the problem is that it takes unnecessarily long for the charging.

Figure 3A:
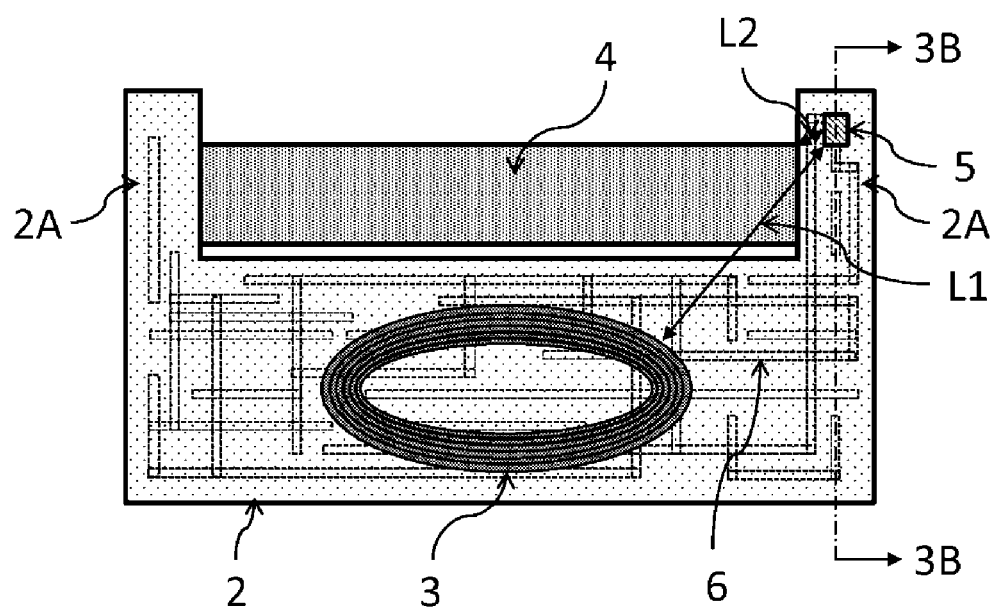
FIG. 3A is a schematic plan view of the battery-embedded device in the first exemplary embodiment.
Figure 3B:
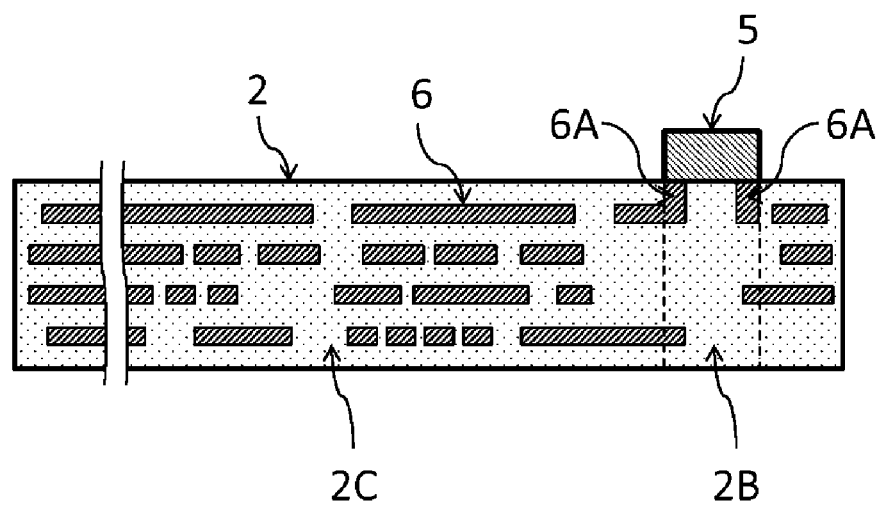
FIG. 3B is a schematic cross-sectional view taken along line 3B-3B in FIG. 3A.

FIG. 3A is a schematic plan view of the battery-embedded device in the first exemplary embodiment, and FIG. 3B is a schematic cross-sectional view taken along line 3B-3B in FIG. 3A. In addition, in FIG. 3A, the wirings buried in substrate 2 are designated by dotted lines.

As illustrated in FIGS. 3A and 3B, substrate 2 is the multi-layer wiring substrate in which wirings 6 are buried in many layers. Wiring 6 is made of an electrically-conductive material, for example, metal such as copper (Cu). Wiring 6 is 0.07 mm to 0.5 mm in width, 0.02 mm to 0.04 mm in height, and 0.5 mm to 30 mm in length. Furthermore, spaces among wirings 6 in substrate 2 are filled with insulating material such as epoxy resin, and wirings 6 are electrically connected, without causing a short circuit in the substrate, to the electronic components such as power receiving coil 3 and temperature sensor 5 disposed on substrate 2, the electronic circuit such as the charge control circuit (not illustrated), battery 4 and the like. In addition, as for battery 4, its cylindrical side surface and both end surfaces (having the positive terminal and the negative terminal of battery 4, respectively) are fixed to substrate 2 with the bonding agent, for example. Thus, battery 4 is fixed to substrate 2 on its three surfaces, so that it can be strongly fixed to substrate 2. Furthermore, the both terminals of battery 4 are electrically connected to wirings 6 in substrate 2 through contact terminals or lead wires.

Here, since wiring 6 in substrate 2 is made of an electrically-conductive material, it is heated by induction heating generated by the alternating magnetic field sent from power transmitting coil 11 to power receiving coil 3. The term "induction heating" means that an eddy current is generated in the electrically-conductive material by the alternating magnetic field, and heat is generated by resistance heating due to the eddy current. Therefore, the temperature rises near wiring 6 in substrate 2, and when temperature sensor 5 exists around there, it could be affected by that temperature and measure the temperature which is higher than the actual temperature of battery 4.

Thus, according to this exemplary embodiment, as illustrated in FIG. 3B, wiring 6 is disposed so as possibly not to exist in region 2B which is immediately below temperature sensor 5, in substrate 2. That is, an occupancy rate of wiring 6 in region 2B which is immediately below temperature sensor 5 is lower than an occupancy rate of wiring 6 in region 2C other than region 2B which is immediately below temperature sensor 5. Here, the occupancy rate of the wiring in the present disclosure means a ratio of a volume of the wirings to a whole volume in the target region.

Thus, even when the alternating magnetic field sent from power transmitting coil 11 to power receiving coil 3 is applied to substrate 2, because of the low occupancy rate of wiring 6 in region 2B which is immediately below temperature sensor 5, temperature sensor 5 can be prevented from being affected by wiring 6 which is raised in temperature due to the alternating magnetic field.

Figure 3C:
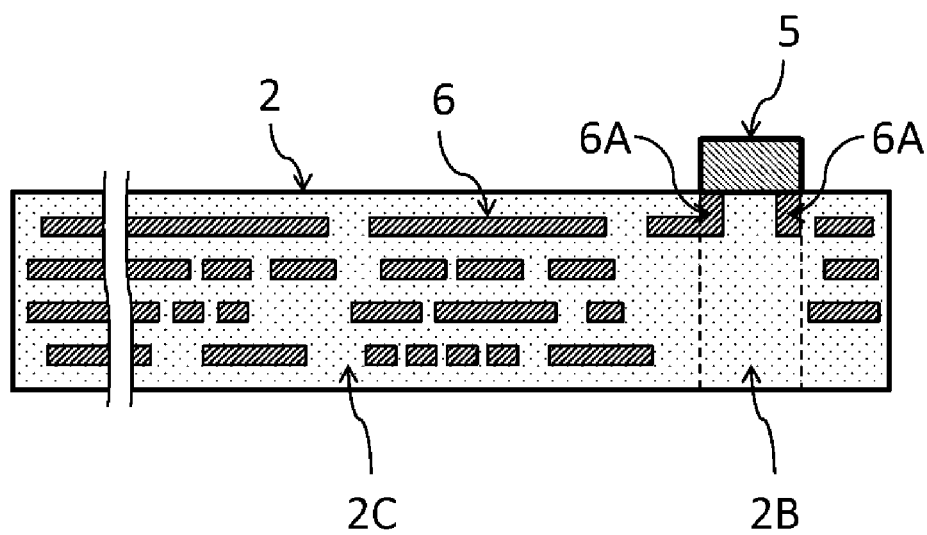
FIG. 3C is a schematic cross-sectional view of another example in FIG. 3B.

Here, as illustrated in FIG. 3C, it is preferable that wiring 6 does not exist in region 2B which is immediately below temperature sensor 5 except for wiring 6A (a part of wiring 6) connected to temperature sensor 5. Thus, region 2B which is immediately below temperature sensor 5 can be more effectively prevented from being heated, so that temperature sensor 5 can be more effectively prevented from being affected by wiring 6 which is raised in temperature due to the alternating magnetic field.

Furthermore, wiring 6A connected to temperature sensor 5 may not be disposed in region 2B which is immediately below temperature sensor 5, but may be disposed in a peripheral region other than region 2B so as to be exposed on a surface of substrate 2, and temperature sensor 5 and wiring 6A may be electrically connected through a lead wire.

In this case, wiring 6 does not exist in region 2B which is immediately below temperature sensor 5. As a result, region 2B which is immediately below temperature sensor 5 can be more effectively prevented from being heated, so that temperature sensor 5 can be more effectively prevented from being affected by wiring 6 which is raised in temperature due to the alternating magnetic field.

Here, it is preferable that the occupancy rate of wiring 6 in region 2C other than region 2B which is immediately below temperature sensor 5 is about 20% to 100%, and the occupancy rate of wiring 6 in region 2B which is immediately below temperature sensor 5 is 20% or less.

In addition, in order to increase power transmission efficiency from power transmitting coil 11 to power receiving coil 3, electronic device 20 is disposed such that power transmitting coil 11 almost coincides with power receiving coil 3 in a planar position at the time of charging. Therefore, the intensity of the alternating electric field is highest at a position of power receiving coil 3 on substrate 2, and the intensity of the alternating electric field decreases with distance from power receiving coil 3. That is, wiring 6 in substrate 2 generates a large amount of heat at a position near power receiving coil 3, and the heat amount decreases with distance from power receiving coil 3.

As a result, as distance L1 between temperature sensor 5 and power receiving coil 3 increases, temperature sensor 5 can be more effectively prevented from being affected by wiring 6 which is raised in temperature due to the alternating magnetic field. Meanwhile, distance L2 between temperature sensor 5 and battery 4 is to be as small as possible such that an accurate temperature of battery 4 can be measured. That is, temperature sensor 5 is disposed in a position where distance L1 between temperature sensor 5 and power receiving coil 3 is longer than distance L2 between temperature sensor 5 and battery 4. Thus, temperature sensor 5 can be more effectively prevented from being affected by wiring 6 which is raised in temperature due to the alternating magnetic field. Here, in the present disclosure, distance L1 between temperature sensor 5 and power receiving coil 3 means a shortest distance between temperature sensor 5 and power receiving coil 3, and distance L2 between temperature sensor 5 and battery 4 means a shortest distance between temperature sensor 5 and battery 4.

Here, distance L2 between temperature sensor 5 and battery 4 is preferably about 1 mm to 3 mm, and distance L1 between temperature sensor 5 and power receiving coil 3 is preferably 2 mm or more. That is, distance L1 between temperature sensor 5 and power receiving coil 3 is preferably twice or more longer than distance L2 between temperature sensor 5 and battery 4.

In addition, normally, a bonding agent and a protection resin are filled in a region between temperature sensor 5 and battery 4, so that the temperature of battery 4 is transferred to temperature sensor 5 by heat conduction in the resin.

In this exemplary embodiment, substrate 2 has projection portion 2A, and temperature sensor 5 is disposed on projection portion 2A of substrate 2, so that distance L1 between temperature sensor 5 and power receiving coil 3 can be long without increasing a whole size. Furthermore, the end surface of battery 4 is fixed to projection portion 2A, so that temperature sensor 5 can be disposed near battery 4. Thus, temperature sensor 5 can be more effectively prevented from being affected by wiring 6 which is raised in temperature due to the alternating magnetic field from power transmitting coil 11 without increasing the size of the battery-embedded device as a whole.

As described above, according to the battery-embedded device in this exemplary embodiment, temperature sensor 5 can be prevented from being affected by wiring 6 which is raised in temperature due to the alternating magnetic field from power transmitting coil 11, so that even when power receiving coil 3 is disposed on substrate 2, temperature sensor 5 for measuring the temperature of battery 4 can be prevented from deteriorating in measurement accuracy.

First Variation

Figure 4A:
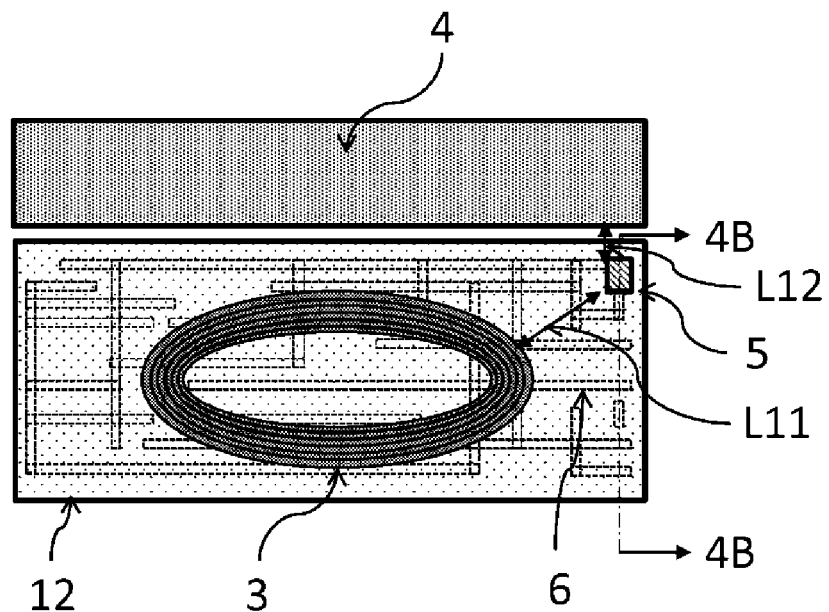
FIG. 4A is a schematic plan view of a battery-embedded device in a first variation of the first exemplary embodiment.
Figure 4B:
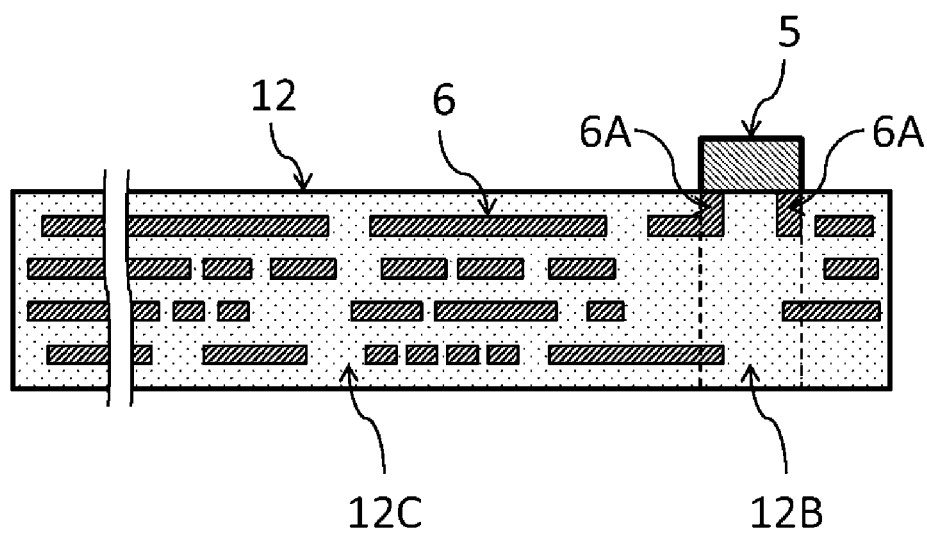
FIG. 4B is a schematic cross-sectional view taken along line 4B-4B in FIG. 4A.

FIG. 4A is a schematic plan view of a battery-embedded device in the first variation of the first exemplary embodiment, and FIG. 4B is a schematic cross-sectional view taken along line 4B-4B in FIG. 4A. In FIG. 4A, wirings buried in substrate 12 are designated by dotted lines.

In this variation, substrate 12 is different in shape from substrate 2 in the first exemplary embodiment. Furthermore, due to the difference in shape of substrate 12, temperature sensor 5 is differently disposed. Other configurations are similar to those in the first exemplary embodiment, and the same reference mark is affixed to the same component.

As illustrated in FIG. 4A, substrate 12 in this variation does not have a projection portion and has a rectangular shape in plan view. A width of substrate 12 is almost equal to a length of battery 4. Therefore, the battery-embedded device can be small as a whole in accordance with a size of battery 4. In addition, as for battery 4, its side surface of a cylindrical shape is fixed to substrate 12 with a bonding agent (not illustrated), for example. A positive terminal and a negative terminal of battery 4 are electrically connected to wirings 6 in substrate 12 through lead wires.

Furthermore, temperature sensor 5 is disposed near a corner of substrate 12 at a side of battery 4. Thus, temperature sensor 5 is disposed near battery 4 and can measure a temperature of battery 4 while it can be disposed distantly from power receiving coil 3. Furthermore, a thickness of substrate 12 and other components are similar to those in the first exemplary embodiment.

Furthermore, similar to the first exemplary embodiment, as illustrated in FIG. 4B, wirings 6 are disposed so as possibly not to exist in region 12B which is immediately below temperature sensor 5, in substrate 12. That is, an occupancy rate of wiring 6 in region 12B which is immediately below temperature sensor 5 is lower than an occupancy rate of wiring 6 in region 12C other than region 12B which is immediately below temperature sensor 5.

Thus, even when an alternating magnetic field sent from power transmitting coil 11 to power receiving coil 3 is applied to substrate 2, because of the low occupancy rate of wiring 6 in region 12B which is immediately below temperature sensor 5, temperature sensor 5 can be prevented from being affected by wiring 6 which is raised in temperature due to the alternating magnetic field.

In addition, as for substrate 12 in this variation also, as illustrated in FIG. 3C, it is preferable that wiring 6 does not exist in region 12B which is immediately below temperature sensor 5 except for wiring 6A (a part of wiring 6) connected to temperature sensor 5. Furthermore, similar to the description in the first exemplary embodiment, wiring 6 may not exist in region 12B which is immediately below temperature sensor 5.

In this variation also, temperature sensor 5 is disposed in a position where distance L11 between temperature sensor 5 and power receiving coil 3 is longer than distance L12 between temperature sensor 5 and battery 4. Thus, temperature sensor 5 can be more effectively prevented from being affected by wiring 6 which is raised in temperature due to the alternating magnetic field.

As described above, according to the battery-embedded device in this exemplary embodiment, the whole size can be small, and temperature sensor 5 can be prevented from being affected by wiring 6 which is raised in temperature due to the alternating magnetic field from power transmitting coil 11, so that even when power receiving coil 3 is disposed on substrate 12, temperature sensor 5 for measuring the temperature of battery 4 can be prevented from deteriorating in measurement accuracy.

Second Variation

Figure 5A:
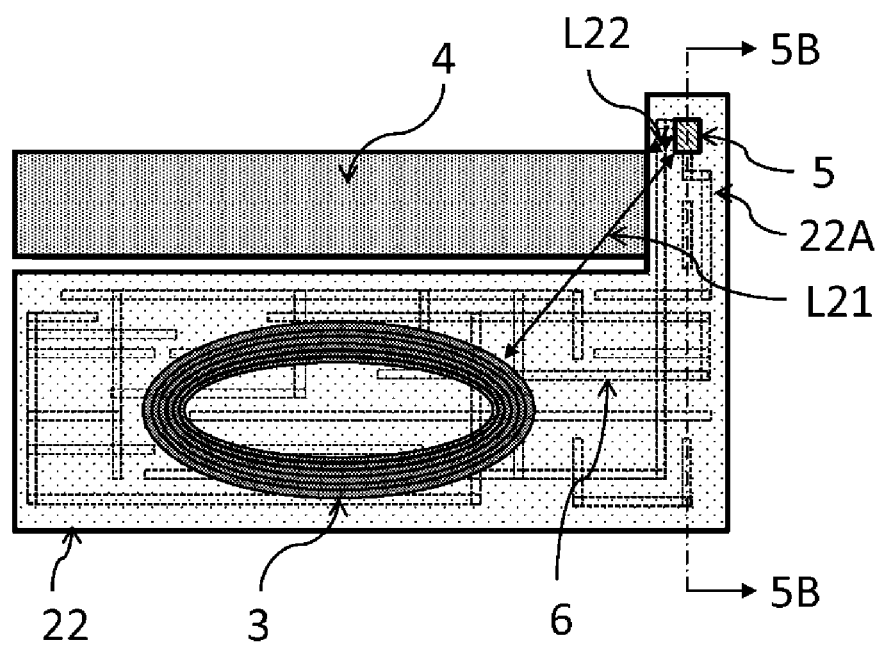
FIG. 5A is a schematic plan view of a battery-embedded device in a second variation of the first exemplary embodiment.
Figure 5B:
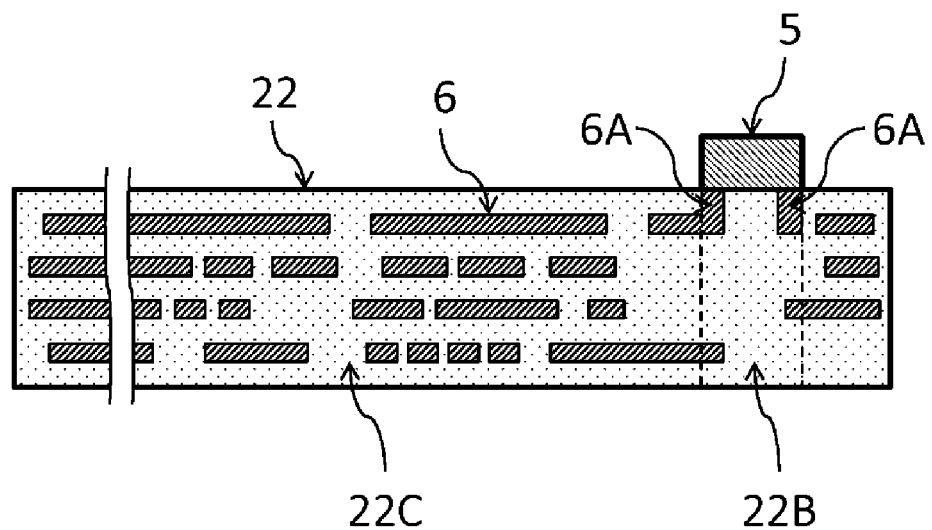
FIG. 5B is a schematic cross-sectional view taken along line 5B-5B in FIG. 5A.

FIG. 5A is a schematic plan view of a battery-embedded device in the second variation of the first exemplary embodiment, and FIG. 5B is a schematic cross-sectional view taken along line 5B-5B in FIG. 5A. In FIG. 5A, wirings buried in substrate 22 are designated by dotted lines.

In this variation, substrate 22 is different in shape from substrate 2 in the first exemplary embodiment. Other configurations are similar to those in the first exemplary embodiment, and the same reference mark is affixed to the same component.

As illustrated in FIG. 5A, substrate 22 in this variation has projection portion 22A on only one side of battery 4, and temperature sensor 5 is disposed on projection portion 22A. Thus, temperature sensor 5 is disposed near battery 4 and can measure a temperature of battery 4 while it can be disposed distantly from power receiving coil 3. On the other hand, unlike the first exemplary embodiment, the other projection portion which does not have temperature sensor 5 is not provided, so that a whole size can be small. A thickness of substrate 22 and other components are similar to those in the first exemplary embodiment.

Furthermore, similar to the first exemplary embodiment, as illustrated in FIG. 5B, wirings 6 are disposed so as possibly not to exist in region 22B which is immediately below temperature sensor 5, in substrate 22. That is, an occupancy rate of wiring 6 in region 22B which is immediately below temperature sensor 5 is lower than an occupancy rate of wiring 6 in region 22C other than region 22B which is immediately below temperature sensor 5.

Thus, when an alternating magnetic field sent from power transmitting coil 11 to power receiving coil 3 is applied to substrate 22, because of the low occupancy of wiring 6 in region 22B which is immediately below temperature sensor 5, temperature sensor 5 can be prevented from being affected by wiring 6 which is raised in temperature due to the alternating magnetic field.

Here, as for substrate 22 in this variation also, as illustrated in FIG. 3C, it is preferable that wiring 6 does not exist in region 22B which is immediately below temperature sensor 5 except for wiring 6A connected to temperature sensor 5. In addition, similar to the description in the first exemplary embodiment, wiring 6 may not exist in region 22B which is immediately below temperature sensor 5.

In this variation also, temperature sensor 5 is disposed in a position where distance L21 between temperature sensor 5 and power receiving coil 3 is longer than distance L22 between temperature sensor 5 and battery 4. Thus, temperature sensor 5 can be more effectively prevented from being affected by wiring 6 which is raised in temperature due to the alternating magnetic field.

As described above, according to the battery-embedded device in this exemplary embodiment, the whole size can be small, and temperature sensor 5 can be prevented from being affected by wiring 6 which is raised in temperature due to the alternating magnetic field from power transmitting coil 11, so that even when power receiving coil 3 is disposed on substrate 22, temperature sensor 5 for measuring the temperature of battery 4 can be prevented from deteriorating in measurement accuracy.

Second Exemplary Embodiment

Figure 6:
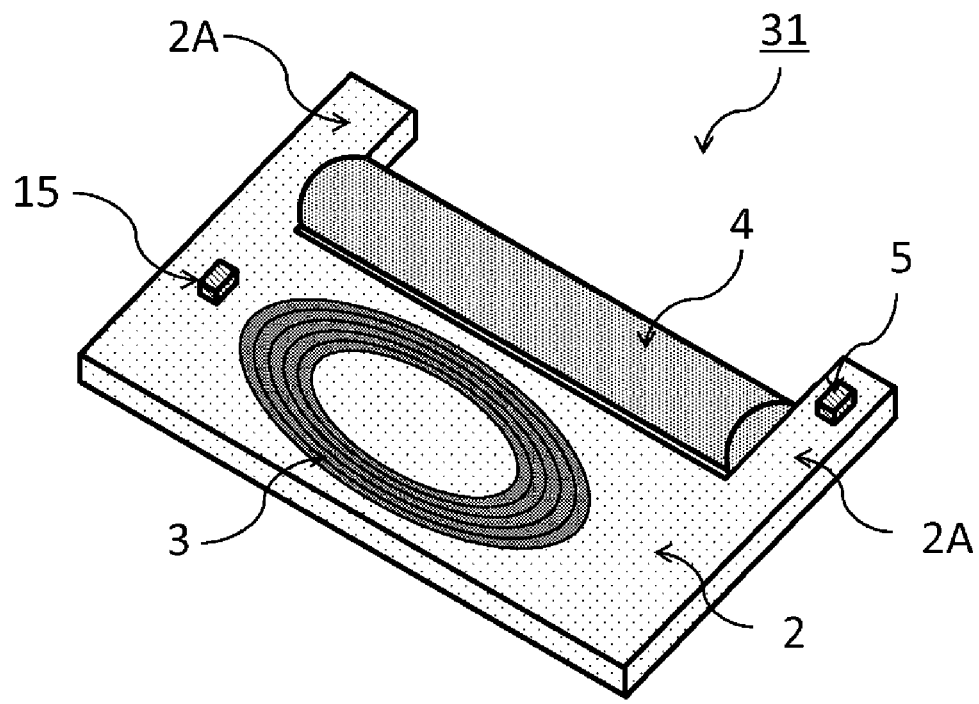
FIG. 6 is schematic perspective view illustrating an outer appearance of a battery-embedded device in a second exemplary embodiment.
Figure 7:
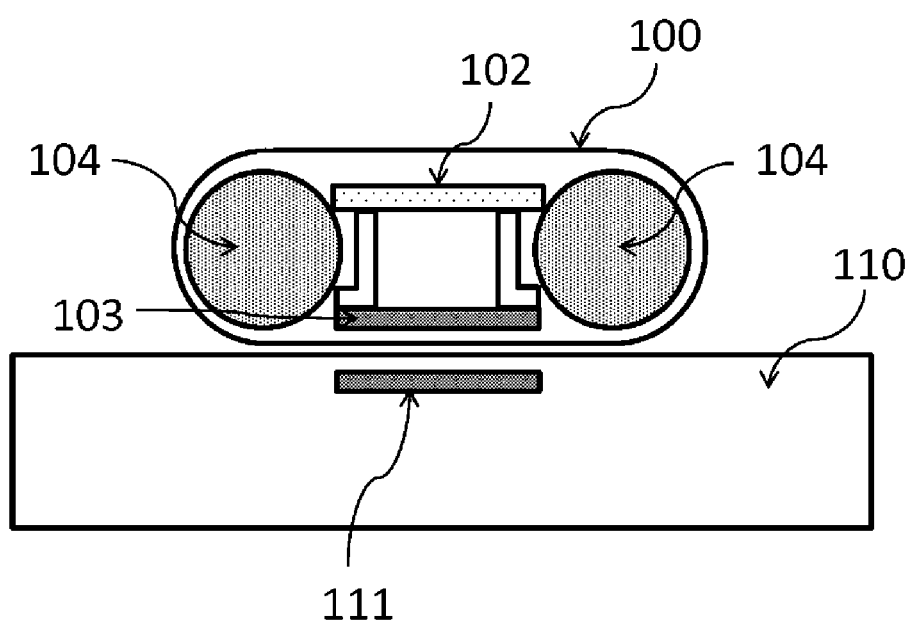
FIG. 7 is a schematic view of a charge system using a conventional battery-embedded device (battery pack).

FIG. 6 is a schematic perspective view illustrating an outer appearance of a battery-embedded device in a second exemplary embodiment. As illustrated in FIG. 6, battery-embedded device 31 includes substrate 2, power receiving coil 3, battery 4, and first temperature sensor 5 and further includes second temperature sensor 15 provided on substrate 2 away from battery 4. Other configurations are similar to those in the first exemplary embodiment, and the same reference mark is affixed to the same component.

According to this exemplary embodiment, first temperature sensor 5 is disposed near battery 4 to measure a temperature of battery 4, while second temperature sensor 15 measures a temperature of substrate 2 positioned away from battery 4. That is, a distance between second temperature sensor 15 and battery 4 is longer than a distance between first temperature sensor 5 and battery 4. Thus, based on comparison between a first measurement temperature measured by first temperature sensor 5 and a second measurement temperature measured by second temperature sensor 15, when the first measurement temperature is higher, determination can be made that battery 4 is in an overheated state or the temperature of substrate 2 is raised as a whole, according to a difference between the first measurement temperature and the second measurement temperature. On the other hand, when the second measurement temperature is higher than the first measurement temperature, it is expected that the temperature of battery 4 is raised by the heat conduction of substrate 2.

As described above, according to this exemplary embodiment, with the measurement temperatures of the two temperature sensors, charge control can be more appropriately performed.

In addition, an effect due to another configuration similar to that of the first exemplary embodiment is achieved similarly to the first exemplary embodiment. In addition, the above first variation and second variation may be added to the configuration of this exemplary embodiment.

The battery-embedded device in the present disclosure has the effect of preventing inappropriate charge control due to low accuracy in measuring a battery temperature, and the battery-embedded device is suitably used in various electronic devices.

The invention claimed is:

1. A battery-embedded device comprising:
    a multi-layer wiring substrate in which a wiring is buried;
    a coil fixed to the multi-layer wiring substrate;
    a battery fixed to the multi-layer wiring substrate; and
    a first temperature detecting element that is disposed on the multi-layer wiring substrate and configured to detect a temperature of the battery,
    wherein an occupancy rate of the wiring in a first region of the multi-layer wiring substrate which is immediately below the first temperature detecting element is lower than an occupancy rate of the wiring in a second region of the multi-layer wiring substrate other than the first region.

2. The battery-embedded device according to claim 1, wherein:
    the multi-layer wiring substrate has a projection portion nearby the battery, and the first temperature detecting element is disposed on the projection portion.

3. The battery-embedded device according to claim 1, wherein
only one or more parts of the wiring which are directly connected to the first temperature detecting element exists in the first region.

4. The battery-embedded device according to claim 1, wherein
a distance between the first temperature detecting element and the coil is longer than a distance between the first temperature detecting element and the battery.

5. The battery-embedded device according to claim 1, further comprising a second temperature detecting element configured to detect a temperature of the multi-layer wiring substrate,
wherein a distance between the second temperature detecting element and the battery is longer than the distance between the first temperature detecting element and the battery.

6. A battery-embedded device comprising:
a substrate having a wiring;
a coil fixed to the substrate;
a battery fixed to the substrate;
a first temperature detecting element that is disposed on the substrate and configured to detect a temperature of the battery; and
a second temperature detecting element configured to detect a temperature of the substrate, wherein:
an occupancy rate of the wiring in a first region of the substrate which is immediately below the first temperature detecting element is lower than an occupancy rate of the wiring in a second region of the substrate other than the first region, and
a distance between the second temperature detecting element and the battery is longer than a distance between the first temperature detecting element and the battery.

7. The battery-embedded device according to claim 6, wherein:
the substrate has a pair of projection portions, and
the battery is disposed between the pair of projection portions.

8. The battery-embedded device according to claim 7, wherein:
the first temperature detecting element is disposed on one of the pair of projection portions.

9. The battery-embedded device according to claim 1, wherein a plurality of wirings is buried in the multi-layer wiring substrate.

10. The battery-embedded device according to claim 9, wherein an occupancy rate of the plurality of wirings in a first region of the multi-layer wiring substrate which is immediately below the first temperature detecting element is lower than an occupancy rate of the plurality of wirings in a second region of the multi-layer wiring substrate other than the first region,
the occupancy rate of the plurality of wirings in the first region is about 20% or less, and
the occupancy rate of the plurality of wirings in the second region is 20% to 100%.

* * * * *